United States Patent Office 3,549,627
Patented Dec. 22, 1970

3,549,627
2,6-DISUBSTITUTED-4H-PYRIMIDO[5,4-d][1,3] OXAZIN-4-ONES
Dong H. Kim, Wayne, and Arthur A. Santilli, Havertown, Pa., assignors to American Home Products Corporation, New York, N.Y., a corporation of Delaware
No Drawing. Filed Apr. 5, 1968, Ser. No. 719,238
Int. Cl. C07d 51/56
U.S. Cl. 260—244                                  9 Claims

ABSTRACT OF THE DISCLOSURE

The present invention is concerned with 2-methyl-6-substituted - 4H - pyrimido[5,4 - d][1,3]oxazin - 4 - ones and 2 - trifluoromethyl - 6 - substituted - 4H - pyrimido [5,4-d][1,3]oxazin - 4 - ones which are pharmacologically active as central nervous system depressants. Further, these compounds are valuable intermediates in the preparation of other pharmacologically active compounds.

---

This invention relates to new and novel pyrimidooxazinones. In particular, it is concerned with 2-methyl-6-substituted - 4H - pyrimido[5,4-d][1,3]oxazin - 4 - ones and 2 - trifluoromethyl - 6 - substituted - 4H - pyrimido [5,4 - d][1,3]oxazin - 4 - ones which have demonstrated central nervous system depressant properties when tested under standard and accepted biological procedures. Further, these compounds are useful intermediates in the preparation of other pharmacologically active compounds.

The new and novel compounds within the scope of the present invention are exemplified by those having the formula:

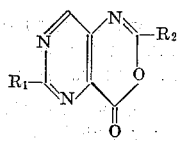

wherein $R_1$ is selected from the group consisting of lower alkyl, phenyl, halophenyl, lower alkylphenyl and lower alkoxyphenyl and $R_2$ is selected from the group consisting of methyl and trifluoromethyl. As employed herein the terms "lower alkyl," and "lower alkoxy" and the like are meant to include both branched and straight chain moieties having from one to about eight carbon atoms. Typical examples thereof are: 2,6 - dimethyl - 4H - pyrimido[5,4-d][1,3]oxazin - 4 - one; 2 - methyl - 6 - phenyl - 4H-pyrimido[5,4 - d][1,3]oxazin - 4 - one; 6 - (m - chlorophenyl) - 2 - methyl - 4H - pyrimido[5,4 - d][1,3]oxazin-4 - one; 6 - phenyl - 2 - trifluoromethyl - 4H - pyrimido [5,4 - d][1,3]oxazin - 4 - one and 6 - (m - chlorophenyl)-2 - trifluoromethyl - 4H - pyrimido[5,4 - d][1,3]oxazin-4-one.

The new and novel compounds of the present invention are prepared by the process which is hereinafter schematically depicted:

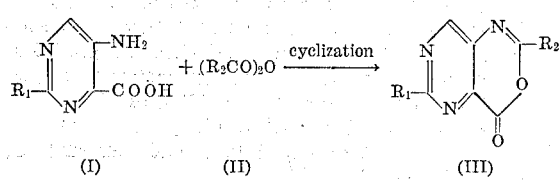

wherein $R_1$ and $R_2$ are defined as above. The reaction is effected by contacting an appropriate 5-amino-4-pyrimidine-carboxylic acid (I) with an acid anhydride (II) at reflux temperatures for a period of about two to about twelve hours.

When the cyclization reaction is complete, the resulting 2,6 - disubstituted - 4H - pyrimido[5,4 - d][1,3]oxazin-4-one (III) is separated by standard recovery procedures e.g. evaporation of the reaction mixture and recrystallization of the residue from an appropriate solvent e.g. an alkanol and acetic anhydride. The 5-amino-4-pyrimidine-carboxylic acids (I) employed as starting materials in the above process are readily prepared by chemical procedures well known in the art. One such process is hereinafter illustrated in Examples I and II.

The new and novel 2,6-substituted-4H-pyrimido[5,4-d] [1,3]oxazin-4-ones (III) of the present invention possess valuable pharmacological activity. In particular, these compounds in standard pharmacological procedures demonstrate nervous system activity and are useful as depressants which have a calming effect.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signals of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap., 107, 385 (1953)] is used to test for analgesia. The experiment is terminated by subjecting each animal to a maximal electroshock to test for anti-convulsant activity.

When the 2 - methyl - 6 - substituted - 4H - pyrimido [5,4 - d][1,3]oxazin - 4 - ones of this invention are administered intraperitoneally to mice as a one percent suspension emulsified with polyethylene oxide sorbitan monooleate, they induce decreased motor activity and ataxia at 12.7 mg./kilo and decreased respiration at 127 mg./kilo. There were no deaths in the test animals at the highest dose used, 400 mg./kilo.

The new and novel 2 - methyl - 6 - substituted-4H-pyrimido[5,4-d][1,3]oxazin-4-ones of the present invention are also useful intermediates in the preparation of their corresponding 5 - acetamide-4-pyrimidinecarboxylic acids and 5-acetamido - 4 - pyriminecarboxylic acid esters which are also pharmacologically active and useful as central nervous system depressant agents as described in copending U.S. patent application, Ser. No. 719,241, entitled "5-Acetamido - 4 - Pyrimidinecarboxylic Acids and Related Compounds" by Dong H. Kim and Arthur A. Santilli, identified by Attorney Docket No. AHP–4637, and filed in the United States Patent Office on the same day as the subject application. Further, the 2-methyl-6-substituted - 4H - pyrimido[5,4-d][1,3]oxazin-4-ones of this invention are useful intermediates in the preparation of their corresponding 5 - acetamido - 4 - pyrimidinecarboxamides and 5-acetamido-4-pyrimidinecarboxylic acid, hydrazides which are pharmacologically active and useful as anti-convulsant agents, as described in copending U.S. patent application, Ser. No. 719,237, entitled "5-Acetamido-4-Pyrimidinecarboxamides, 5 - Acetamido-4-Pyrimidinecarboxylic Acid Hydrazides and Related Compounds," by Dong H. Kim and Arthur A Santilli, identified by Attorney Docket No. AHP–4658, and filed in the United States Patent Office on the same day as the subject application.

When the 2-trifluoromethyl - 6 - substituted - 4H - pyrimido[5,4-d][1,3]oxazin-4-ones of this invention are administered intraperitoneally to mice as a one percent suspension emulsified with polyethylene oxide sorbitan monooleate, they induce decreased motor activity, decreased respiration and caused no deaths at 400 mg./kilo.

The new and novel 2-trifluoromethyl-6-substituted-4H-pyrimido[5,4-d][1,3]oxazin-4-ones of the present invention are also useful intermediates in the preparation of their corresponding 5-(2,2,2-trifluoroacetamido - 4 - pyrimidinecarboxylic acids which are then deacylated to afford 5-amino-4-pyrimidinecarboxylic acid esters which are pharmacologically active and useful as central nervous system depressant agents. These 5-(2,2,2-trifluoroacetamido) - 4 - pyrimidinecarboxylic acids and 5-amino-4-pyrimidinecarboxylic acid esters are described in the above-identified copending United States patent application, entitled "5-Acetamido - 4 - Pyrimidinecarboxylic Acids and Related Compounds." Further, the 2-trifluoromethyl-6-substituted - 4H - pyrimido[5,4-d][1,3]oxazin-4-ones of the present invention are useful intermediates in the preparation of their corresponding 5-amino - 4 - pyrimidinecarboxamides and 5-amino - 4 - pyrimidinecarboxylic acid, hydrazides which are pharmacologically active and useful as anti-convulsant agents as described in the above-defined copending United States patent application, entitled "5-Acetamido-4-Pyrimidinecarboxamides, 5-Acetamido - 4 - Pyrimidinecarboxylic Acid Hydrazides and Related Compounds."

When the 2,6 - disubstituted 4H-pyrimido[5,4-d][1,3]oxazin-4-ones of the present invention are employed as central nervous system depressant agents they may be administered to warm-blooded animals e.g. mice, rats, guinea pigs, rabbits, cats, dogs, monkeys and the like, alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A 72 ml. portion of a stock solution (6.9 g. sodium in 120 ml. ethanol, is added to a mixture of 34.4 g. of m-chlorobenzamidine hydrochloride in 20 ml. of absolute ethanol at 40° C. Over a seven minute interval there is added, dropwise 24 ml. of a stock solution (25.8 g. mucobromic acid in 40 ml. of ethanol) of mucobromic acid. This rate of addition kept the reaction temperature at 46–50° C. without external heating. When the reaction temperature begins to decrease the remainder of the two stock solutions is added. The reaction mixture is maintained at 40–50° C. for an additional hour and a half. The mixture is then chilled in ice and filtered. The precipitate is dissolved in 1 liter of water and the solution refiltered. Upon acidification of the filtrate with hydrochloric acid, a precipitate is obtained (23 g.) which upon recrystallization from 95% ethanol affords 5-bromo-2 - (m-chlorophenyl)-4-pyrimidinecarboxylic acid, M.P. 162–163° C.

*Analysis.*—Calcd. for $C_{11}H_6BrClN_2O_2$ (percent): C, 42.14; H, 1.93; N, 8.94; Br, 25.49; Cl, 11.31. Found (percent): C, 42.36; H, 1.95; N, 880; Br, 25.4; Cl, 11.32.

EXAMPLE II

Seventy-five milliliters of concentrated ammonium hydroxide is added slowly to a mixture of 15 g. of 5-bromo-2-(m-chlorophenyl) - 4 - pyrimidinecarboxylic acid and 0.2 g. of cupric sulfate pentahydrate. The resulting mixture is placed in a steel bomb, then heated in a steam bath for two and a half hours. After chilling in ice, the precipitate is collected, dissolved in a minimum amount of hot water, treated with charcoal and filtered. The filtrate is acidified with glacial acetic acid giving 6 g. of 5-amino-2-(m-chlorophenyl) - 4 - pyrimidinecarboxylic acid, M.P. 240–2° C.

*Analysis.*—Calcd. for $C_{11}H_8ClN_3O_2$ (percent): C, 52.92; H, 3.23; Cl, 14.20; N, 16.83. Found (percent): C, 52.90; H, 3.33; Cl, 14.2; N, 16.77.

EXAMPLE III

A mixture of 5-amino-2-methyl - 4 - pyrimidinecarboxylic acid (2.1 g.) and acetic anhydride (45 ml.) is refluxed for two and a half hours, then the excess acetic anhydride is removed under reduced pressure. The crude product is recrystallized from absolute ethanol to give 0.3 g. of 2,6-dimethyl-4H-pyrimido[5.4-d][1,3]oxazin-4-one, M.P. 153–154° C.

*Analysis.*—Calcd. for $C_8H_7N_3O_2$ (percent): C, 54.23; H, 3.98; N, 23.72. Found (percent): C, 53.98; H, 4.04; N, 24.01.

Repeating the above procedure to react an appropriate 5-amino-4-pyrimidinecarboxylic acid with acetic anhydride, the following compounds are prepared:

6-ethyl-2-methyl-4H-pyrimido-[5,4-d][1,3]oxazin -4-one;
2-methyl-6-propyl-4H-pyrimido[5,4-d][1,3]oxazin-4-one; and
6-(iso-butyl)-2-methyl-4H-pyrimido[5,4-d][1,3]oxazin-4-one.

EXAMPLE IV

A mixture of 5-amino-2-phenyl - 4 - pyrimidinecarboxylic acid (2.0 g.) and acetic anhydride (45 ml.) is refluxed for three hours. Thereafter the 1.6 g. of product (M.P. 224–226° C.) is separated by chilling the reaction mixture in ice. The precipitate is collected by filtration and recrystallized from acetic anhydride to yield 2-methyl-6 - phenyl - 4H - pyrimido[5,4-d][1,3]oxazin-4-one, M.P. 225–227° C.

*Analysis.*—Calcd. for $C_{13}H_9N_3O_2$ (percent): C, 65.26; H, 3.79; N, 17.57. Found (percent): C, 65.56; H, 3.86; N, 17.76.

EXAMPLE V 6-(m-chlorophenyl) - 2 - methyl - 4H - pyrimido[5,4-d][1,3]oxazin-4-one is prepared as in Example III from 3.0 g. of 5-amino - 2 - (m-chlorophenyl)-4-pyrimidinecarboxylic acid and 65 ml. of acetic anhydride to give 2.9 g. of product, M.P. 209–212° C. Recrystallization from acetic anhydride increased the M.P. to 210–213° C.

*Analysis.*—Calcd. for $C_{13}H_8ClN_3O_2$ (percent): C, 57.05; H, 2.95; N, 15.36; Cl, 12.96. Found (percent): C, 56.89; H, 2.97; N, 15.25; Cl, 12.9.

In the same manner, 6-(p-chlorophenyl)-2-methyl-4H-pyrimido[5,4-d][1,3] oxazin-4-one;
6-(m-iodophenyl)-2-methyl-4H-pyrimido[5,4-d][1,3] oxazin-4-one;

6-(p-bromophenyl)-2-methyl-4H-pyrimido[5,4-d][1,3]
oxazin-4-one; and
6-(p-fluorophenyl)-2-methyl-4H-pyrimido[5,4-d][1,3]
oxazin-4-one are synthesized.

EXAMPLE VI

Repeating the procedure of Examples III–V to react an appropriate 5-amino-4-pyrimidinecarboxylic acid with acetic anhydride, the following compounds are produced:

6-(p-tolyl)-2-methyl-4H-pyrimido[5,4-d][1,3]oxazin-4-one;
2-methyl-6-(p-isopropoxyphenyl)-4H-pyrimido[5,4-d][1,3]oxazin-4-one;
6-(m-ethylphenyl)-2-methyl-4H-pyrimido[5,4-d][1,3]oxazin-4-one;
6-(p-butylphenyl)-2-methyl-4H-pyrimido[5,4-d][1,3]oxazin-4-one;
6-(p-methoxyphenyl)-2-methyl-4H-pyrimido[5,4-d][1,3]oxazin-4-one; and
6-(o-ethoxyphenyl)-2-methyl-4H-pyrimido[5,4-d][1,3]oxazin-4-one.

EXAMPLE VII

Two and a half grams of 5-amino-2-phenyl-4-pyrimidinecarboxylic acid is added to 30 ml. of trifluoroacetic anhydride. Heat is evolved during the addition. The resulting mixture is refluxed for seven and a half hours, and set overnight at room temperature whereby the product separated. The product is collected on a filter and washed with trifluoroacetic anhydride to give 3.2 g. of 6-phenyl-2-trifluoromethyl-4H-pyrimido[5,4-d][1,3]oxazin-4-one, M.P. 210–212° C.

*Analysis.*—Calcd. for $C_{13}H_6F_3N_3O_2$ (percent): C, 53.25; H, 2.06; N, 14.33. Found (percent): C, 53.33; H, 2.03; N, 14.55.

EXAMPLE VIII 6-(m-chlorophenyl) - 2 - trifluoromethyl - 4H - pyrimido[5,4-d][1,3]oxazin-4-one is prepared as in Example VII from 2.5 g. of 5-amino - 2 - (m-chlorophenyl) - 4-pyrimidinecarboxylic acid and 30 ml. of trifluoroacetic anhydride. Refluxing time is extended to twelve hours. Chilling the reaction mixture causes separation of a precipitate which is collected on a filter and washed with trifluoroacetic anhydride. The product weighs 2.3 g. and melts at 176–178° C.

*Analysis.*—Calcd. for $C_{13}H_5ClF_3N_3O_2$ (percent): C, 47.65; H, 1.54; N, 12.82. Found (percent): C, 47.79; H, 1.45; N, 12.77.

In like manner, 6-(p-chlorophenyl)-2-trifluoromethyl-4H-pyrimido[5,4-d][1,3]oxazin-4-one;
6-(p-bromophenyl)-2-trifluoromethyl-4H-pyrimido[5,4-d][1,3]oxazin-4-one; and
6-(p-fluorophenyl)-2-trifluoromethyl-4H-pyrimido[5,4-d][1,3]oxazin-4-one are prepared.

EXAMPLE IX

Repeating the procedure of Examples VII and VIII to react an appropriate 5-amino-4-pyrimidinecarboxylic acid with trifluoroacetic acid, the compounds of the following structural formula are obtained:

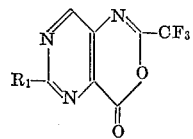

wherein $R_1$ is methyl, ethyl, propyl, p-tolyl, p-propoxyphenyl, m-ethylphenyl, p-butylphenyl, p-methoxyphenyl and o-ethoxyphenyl.

What is claimed is:
1. A compound selected from the group consisting of those having the formula:

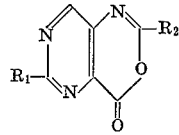

wherein $R_1$ is selected from the group consisting of lower alkyl, phenyl, halophenyl, lower alkylphenyl and lower alkoxyphenyl and $R_2$ is selected from the group consisting of methyl and trifluoromethyl.

2. A compound as described in claim 1 which is: 2,6-dimethyl-4H-pyrimido[5,4-d][1,3]oxazin-4-one.

3. A compound as described in claim 1 which is: 2-methyl-6-phenyl-4H-pyrimido[5,4-d][1,3]oxazin-4-one.

4. A compound as described in claim 1 which is: 6-(m-chlorophenyl) - 2 - methyl-4H-pyrimido[5,4-d][1,3]oxazin-4-one.

5. A compound as described in claim 1 which is: 6-phenyl - 2 - trifluoromethyl- 4 H - pyrimido[5,4-d][1,3]oxazin-4-one.

6. A compound as described in claim 1 which is: 6-(m-chlorophenyl) - 2 - trifluoromethyl-4H-pyrimido[5,4-d][1,3]oxazin-4-one.

7. A compound as described in claim 1 which is: 6-ethyl-2-methyl-4H-pyrimido[5,4-d][1,3]oxazin-4-one.

8. A compound as described in claim 1 which is: 6-(p-tolyl)-2-methyl-4H-pyrimido[5,4-d][1,3]oxazin-4-one.

9. A compound as described in claim 1 which is: 6-(p-chlorophenyl)-2-trifluoromethyl - 4H - pyrimido[5,4-d][1,3]oxazin-4-one.

References Cited

UNITED STATES PATENTS 3,410,850  11/1968  Cragoe et al. _____ 260—244

FOREIGN PATENTS 1,447,967  6/1966  France _____ 260—244

OTHER REFERENCES

Kaupman et al.: German application 1,168,435, April 1964 (12 p.–7/01) (3 pages spec) 260–244.

Patterson et al.: The Ring Index 2nd ed., pages 200–1 (No. 1542, No. 1543) Wash., D.C., Amer. Chem. Soc. 1960.

NATALIE TROUSOF, Primary Examiner

U.S. Cl. X.R.

260—256.4, 999; 424—248